United States Patent

O'Brien et al.

[11] Patent Number: 6,027,679
[45] Date of Patent: Feb. 22, 2000

[54] METHOD FOR SECURING A WIRE HARNESS TO A SURFACE

[75] Inventors: Timothy F. O'Brien, White Lake; Joseph J. Davis, Jr., Ortonville, both of Mich.

[73] Assignee: Lear Automotive Dearborn, Inc., Southfield, Mich.

[21] Appl. No.: 08/920,978

[22] Filed: Aug. 29, 1997

[51] Int. Cl.[7] .............................. B23P 11/02; B29C 44/12
[52] U.S. Cl. .................... 264/272.14; 29/451; 29/453; 264/46.4; 264/272.11
[58] Field of Search ................... 264/46.6, 46.7, 264/46.9, 261, 267, 272.11, 272.14, 46.4; 29/525, 451, 453

[56] References Cited

U.S. PATENT DOCUMENTS

| | | | |
|---|---|---|---|
| 3,084,391 | 4/1963 | Parstorfer | 264/272.14 |
| 3,226,463 | 12/1965 | Wallace | 264/272.14 |
| 3,946,768 | 3/1976 | Fiorentino . | |
| 3,985,951 | 10/1976 | Harris . | |
| 4,104,781 | 8/1978 | Midorikawa | 264/267 |
| 4,230,754 | 10/1980 | Maher et al. | 264/272.11 |
| 4,270,961 | 6/1981 | Faranetta et al. . | |
| 4,444,705 | 4/1984 | Kumasaka et al. . | |
| 4,461,736 | 7/1984 | Takagi | 264/46.9 |
| 4,653,155 | 3/1987 | Hara . | |
| 4,843,707 | 7/1989 | Lake, Jr. et al. | 29/525 |
| 4,882,842 | 11/1989 | Basson et al. | 264/255 |
| 4,923,537 | 5/1990 | Matsushima . | |
| 5,030,116 | 7/1991 | Sakai et al. . | |
| 5,082,253 | 1/1992 | Suzuki et al. . | |
| 5,151,239 | 9/1992 | King, Jr. | 264/272.11 |
| 5,168,124 | 12/1992 | Takase et al. . | |
| 5,230,146 | 7/1993 | Tsuji et al. . | |
| 5,338,014 | 8/1994 | Kitamura . | |
| 5,431,981 | 7/1995 | Tanaka | 428/122 |
| 5,456,791 | 10/1995 | Ueno | 156/556 |
| 5,468,314 | 11/1995 | McGregor et al. | 264/46.6 |
| 5,490,664 | 2/1996 | Justus et al. . | |
| 5,500,179 | 3/1996 | Onishi et al. . | |
| 5,534,665 | 7/1996 | Long | 174/72 A |
| 5,535,511 | 7/1996 | Karasik . | |
| 5,598,627 | 2/1997 | Saka et al. . | |
| 5,645,779 | 7/1997 | Matsumoto | 264/46.5 |
| 5,678,792 | 10/1997 | Arguin et al. | 248/205.1 |
| 5,703,330 | 12/1997 | Kujawski | 174/72 A |
| 5,705,104 | 1/1998 | Trublowski et al. | 264/272.14 |
| 5,743,010 | 4/1998 | Zaguskin et al. | 29/857 |

FOREIGN PATENT DOCUMENTS

| | | | |
|---|---|---|---|
| 0235924 | 1/1987 | European Pat. Off. . | |
| 2740422 | 4/1997 | France . | |
| 1165120 | 3/1964 | Germany | 264/272.14 |

*Primary Examiner*—Allan R. Kuhns
*Attorney, Agent, or Firm*—MacMillan, Sobanski & Todd, LLC

[57] ABSTRACT

A component and wire harness combination includes a component comprising a panel having a channel with an opening. A plurality of wires are disposed in the channel. A sheath encases the plurality of wires in the channel, protecting the wires and retaining them within the channel.

12 Claims, 2 Drawing Sheets

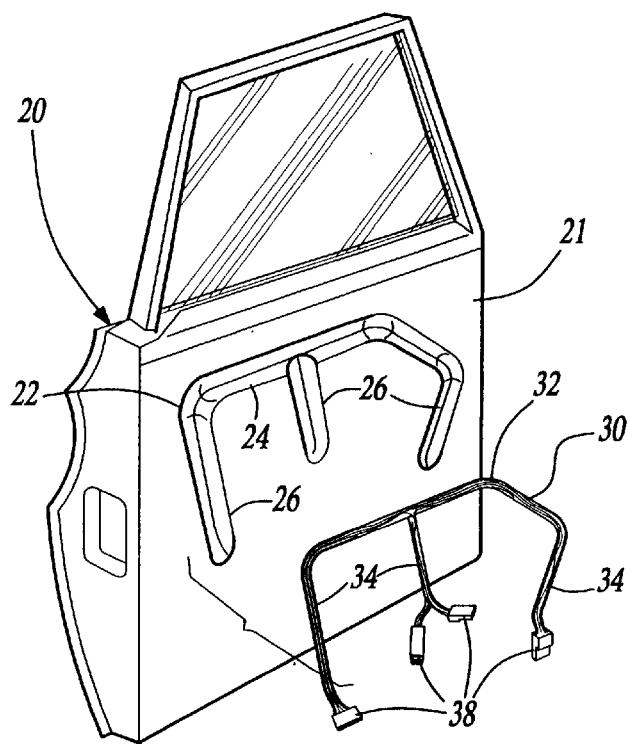
Fig-1
Fig-2
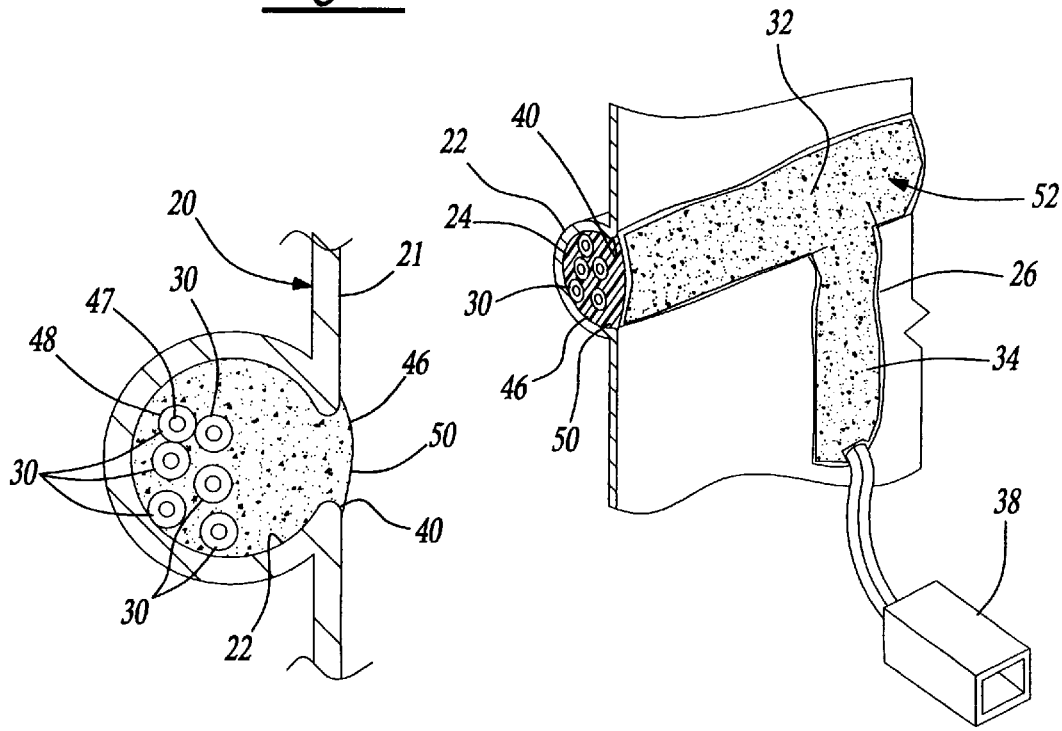
Fig-3
Fig-4

METHOD FOR SECURING A WIRE HARNESS TO A SURFACE

BACKGROUND OF THE INVENTION

The present invention relates to wire harnesses and more particularly to a method and apparatus for securing a wire harness to the surface of a component.

Current vehicles include numerous wire harnesses interconnecting an increasing number of electrical components to user-activated and computer-controlled switches and sensors. Each wire harness comprises a plurality of wires which are bundled to form a main trunk and a plurality of branches extending from the trunk. Typically, each of the branches includes an electrical connector at an outer end.

During assembly of wire harnesses, the wire bundles are held together in an assembly jig, which includes a plurality of wire supports supporting the wires along each of the main trunk and each of the branches. Each wire is placed into the assembly jig onto the appropriate wire supports, i.e. from a first branch at one end of the wire harness, through the main trunk and through a second branch, typically at an opposite end of the wire harness. Electrical connectors are then connected to the outer ends of the wires at the branches. The wires are then wrapped with tape along the entire length of the main trunk and each of the branches. Plastic tubes or sleeves are often secured around the bundled wires in selected locations to protect against mechanical wear caused by vibration. Foam sheets are often wrapped and taped about the bundles in selected areas to provide damping and reduce noise. Rubber gaskets are secured to selected portions of the bundled wires in order to provide water seals at selected locations. Branch identifiers, such as tape labels are often wrapped about the branches near the connectors in order to identify the branch so it is properly mounted and connected.

Wire harnesses are currently secured to other components by a plurality of fasteners, such as christmas tree connectors. As described above, these connectors are taped to the wire harness at numerous locations and snap-fit into apertures on the component. However, securing the connectors to the wire harness with tape is time consuming and unreliable. Further, the wire harness is only connected to the surface of the component at the locations of the connectors.

United Technologies Automotive has developed a new wire harness in which the wires are encased in a molded foam sheath. This is described in more detail in co-pending application U.S. Ser. No. 08/898,663, filed on Jul. 22, 1997 entitled "FOAMED-IN WIRE HARNESSES." Improvements are more fully disclosed in other co-pending applications: "WIRE HARNESS WITH INTEGRAL CONNECTOR" filed on Aug. 29, 1997 and assigned U.S. Ser. No. 08/920,768; "APPARATUS FOR CENTERING WIRE HARNESS IN MOLD" filed on Aug.29, 1997 and assigned U.S. Ser. No. 08/920,458; "MOLD FOR ASSEMBLING AND FORMING WIRE HARNESS" filed on Aug. 29, 1997 and assigned U.S. Ser. No. 08/919,946; "WIRE HARNESS WITH SPLICE LOCATORS" filed on Aug. 29, 1997 and assigned U.S. Ser. No. 08/920,589; "MULTISHOT MOLDS FOR MANUFACTURING WIRE HARNESS" filed on Aug. 29, 1997 and assigned U.S. Ser. No. 08/920,589; "FOAM WIRE HARNESS WITH SHAPE MEMORY" filed on Aug. 29, 1997 and assigned U.S. Ser. No. 08/920,570.

SUMMARY OF THE INVENTION

The present invention secures a wire harness to a component, such as a panel in a vehicle. The component includes a channel having an opening. A plurality of wires are disposed in the channel. A sheath encases the plurality of wires in the channel, thereby protecting the wires and securing them to the component. Preferably the sheath has a diameter larger than the opening of the channel.

In the method according to the present invention, a channel is formed in the component and a plurality of wires are routed in the channel. A polymer is introduced around the plurality of wires and retains the plurality of wires in the channel. According to one embodiment, the wires are first routed in the channel and the polymer is introduced into the channel around the plurality of wires. The polymer is molded by the channel around and among the wires and conforms to the dimensions of the channel. When the polymer sets, the wires are protected by the polymer and secured within the channel.

In another embodiment, a sheath is formed of the polymer around the plurality of wires prior to installation of the wire harness in the component. The channel includes an opening which is less than a diameter of the sheath. The wire harness is snap-fit into the channel in the component deforming the sheath inwardly during insertion. The sheath protects the wires and retains the wires within the channel.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is an exploded perspective view of a component and wire harness of the present invention;

FIG. 2 is a sectional view of the component and wire harness of FIG. 1 assembled in accordance with a first step in a method of the present invention;

FIG. 3 is the component and wire harness of FIG. 2 secured in accordance with a subsequent step in a method of the present invention;

FIG. 4 is a partial perspective view of the component and wire harness of FIG. 3;

DETAILED DESCRIPTION OF A PREFERRED EMBODIMENT

Figure 5:
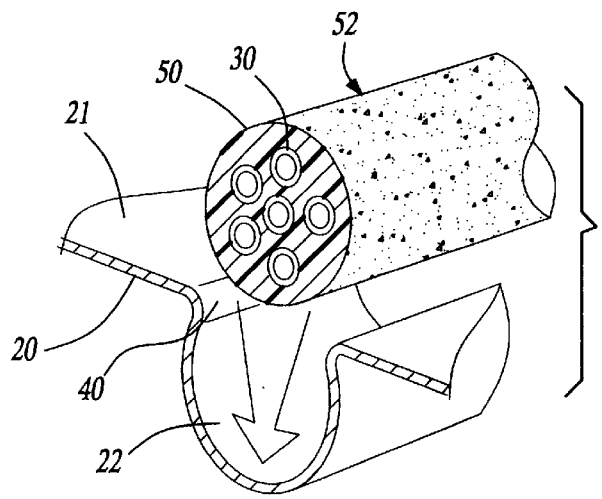
FIG. 5 illustrates an alternate method for assembling a component and wire harness of the present invention.

A method for securing a wire harness to a component 20 such as a vehicle door, is generally shown in FIGS. 1–3. In FIG. 1, the component 20 generally includes a panel 21 having an elongated concave channel 22 comprising a main trunk 24 continuous with a plurality of branches 26. A plurality of wires 30 are preferably spot-taped, twisted or otherwise bundled to form a main trunk 32 branching into a plurality of branches 34. An electrical connector 38 is electrically connected to the wires 30 at the end of each branch 34.

As can be seen in FIG. 2, the panel 21 includes an opening 40 leading to the channel 22 and which is narrower than the interior of the channel 22. The wires 30 are routed in the component 20, positioning the main trunk 32 of the wires 30 in the main trunk 24 of the channel 22 and each of the branches 34 of the wires 30 in the branches 26 of the channel 22. A polymer 46, preferably foam, and most preferably Elastoflex® available from BASF, is then sprayed in a generally liquid form into the channel 22. The polymer 46 surrounds and encloses the wires 30 filling the channel 22. The polymer 46 is preferably sprayed by a spray head, but could also be poured or otherwise introduced into the channel 22.

As can be seen in FIG. 3, when the polymer 46 sets, it forms a sheath 50 within the channel 22. Each of the wires 30 comprises a conductor 47 surrounded by an insulator 48. The sheath 50 is molded by the channel 22 around and among the wires 30 and preferably has a diameter larger than the opening 40. The sheath 50 thus protects the wires 30 and retains the wires 30 within the channel 22.

As can be seen in FIG. 4, the sheath 50 extends along the main trunk 24 and branches 26 of the channel 22. The electrical connectors 38 secured to the ends of the branches 34 extend outwardly from the channel 22 for electrical connection to complementary connectors. The sheath 50 and wires 30 form a wire harness 52 within the channel 22 of the component 20. In this manner, the wires 30 are protected and retained within the channel 22 of the component 20. Assembly and installation are simplified and the wires 30 are secured to the component 20 along their entire length.

An alternate method for securing the wire harness 52 to a component 20 is shown in FIG. 5. In FIG. 5, the sheath 50 is first molded about the wires 30 to form the wire harness 52. The sheath 50 preferably has a diameter greater than the opening 40 of the channel 22. The wire harness 52 is pressed into the channel 22. The sheath 50 is deformed inwardly temporarily as it passes through the opening 40 and then expands within the channel 22. The wires 30 are then protected and secured by the sheath 50 within the channel 22.

Figure 6:
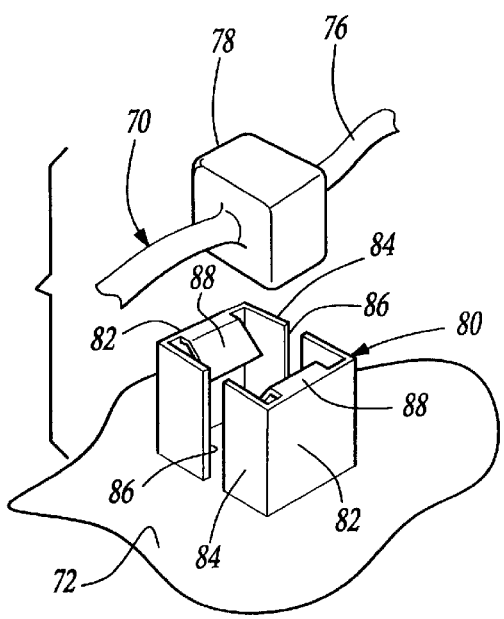
FIG. 6 illustrates a second alternate method for assembling the wire harness and component of the present invention.

Another alternate method for securing the wire harness 70 to a component 72 is shown in FIG. 6. The wire harness 70 is generally identical to those described above and includes a plurality of wires 74 surrounded by a molded polymer sheath 76. Wire harness 70 further includes a bulb portion 78 having a greater diameter than the remainder of the sheath 76. A connector 80 formed on the component 72 includes a pair of opposed side walls 82. A pair of opposed end walls 84 are perpendicular to side walls 82 and each have slots 86. A pair of deformable tabs 88 extend inward and downward from the side walls 82. The wire harness 70 is secured to the component 72 by inserting the bulb portion 78 into the connector 80. During insertion, the bulb portion 78 deforms the tabs 88 outwardly until the bulb portion 78 is disposed within connector 80 and the sheath 76 is disposed within the slots 86.

Figure 7:
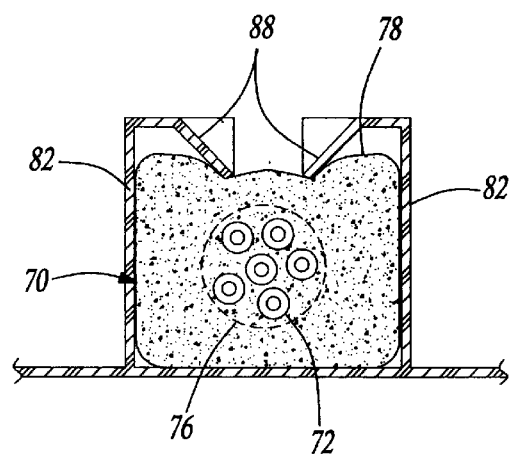
FIG. 7 is a sectional view through the wire harness installed into the component of FIG. 6.

As can be seen in FIG. 7, after insertion, the tabs 88 return inwardly over the bulb portion 78. The bulb portion 78 is preferably deformed inwardly by the side walls 82 and the tabs 88. The bulb portion 78 has a diameter which is greater than the opening between the tabs 88.

Figure 8:
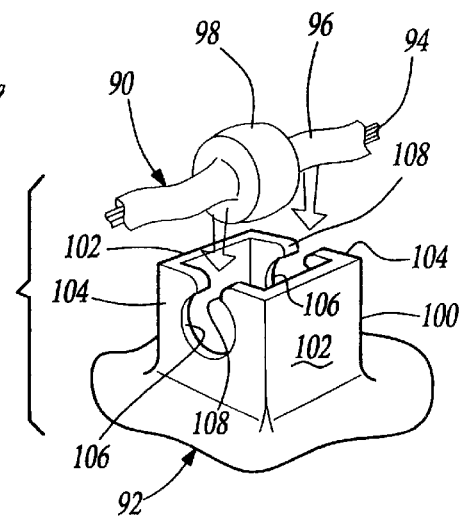
FIG. 8 illustrates an alternate connector for connecting a wire harness to a component.

Another alternate method for securing a wire harness 90 to a component 92 is shown in FIG. 8. The wire harness 90 is generally identical to the wire harnesses described above. The wire harness 90 includes a plurality of wires 94 surrounded by a molded polymer sheath 96. The sheath 96 includes a bulb portion 98 of increased diameter. The component 92 includes a connector 100 having generally parallel opposed side walls 102 and generally parallel opposed end walls 104 having slots 106 with narrowed openings 108. The openings 108 are preferably narrower than the diameter of the sheath 96. The bulb portion 98 of the sheath 96 is snap-fit into the connector 100, with the sheath 96 deforming inwardly temporarily as it passes through the openings 108. The bulb portion 98 prevents axial movement of the wire harness 90 relative to the component 92.

Figure 9:
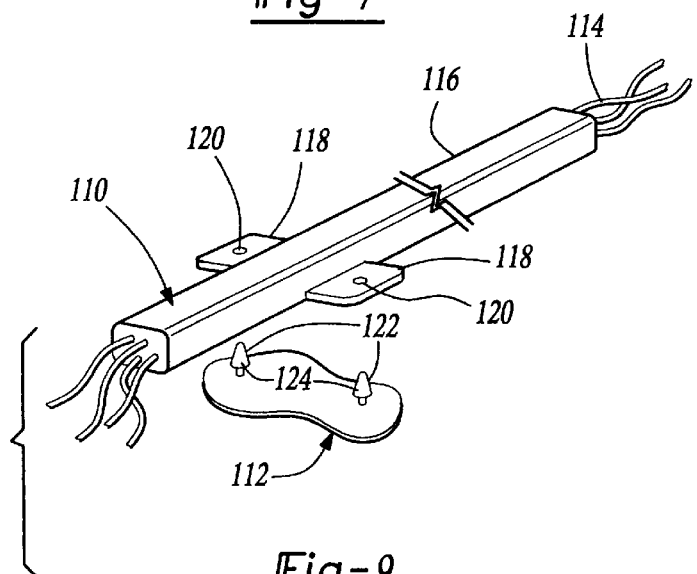
FIG. 9 illustrates another alternate connector for connecting a wire harness to a component.

Another alternate wire harness 110 is shown in FIG. 9 secured to a component 112. The wire harness 110 is generally similar to those previously shown, having a plurality of wires 114 surrounded by a molded polymer sheath 116. The sheath 116 includes an integral flange 118 extending generally radially from the sheath 116. Each flange 118 includes an aperture 120. Connector pins 122 extend upwardly from the component 122 and include heads 124 of increased diameter. The heads 124 can be snap-fit into the apertures 120 in the flange 118 of the sheath 116, temporarily deforming the apertures 120 of the flange 118 radially outwardly and securing the wire harness 110 to the component 112.

It should be apparent that the inventive wire harnesses and methods of attachment can be utilized to secure a wire harness to a variety of components, including but not limited to panels in vehicles. A preferred material is described above; however, those skilled in the art will be aware of other polymers or other materials which may be more suitable for specific applications.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for assembling a wire harness including the steps of:
    a) forming a channel having an elongated opening in a component;
    b) routing a plurality of wires in said channel in said component;
    c) introducing a polymer around said plurality of wires to form a sheath having an outer diameter greater than said opening to said channel
    d) deforming said sheath radially inwardly;
    e) during said step, inserting said sheath and said plurality of wires through said elongated opening into said channel; and
    f) retaining said plurality of wires in said channel with said sheath.

2. The method of claim 1 further including the step of deforming at least one tab formed on the component during said steps d) and e).

3. The method of claim 2 further including the steps of forming a plurality of said at least one tabs on the component adjacent the channel.

4. The method of claim 3 wherein the tabs extend generally away from the opening of the channel.

5. The method of claim 1 further including the step of forming an enlarged portion of increased outer diameter on the sheath.

6. The method of claim 5 further including the step of deforming at least one tab formed on the component with the enlarged portion during said steps d) and e).

7. The method of claim 1 wherein the elongated opening is generally parallel to the channel and the wires.

8. The method of claim 1 wherein the component is a panel.

9. The method of claim 8 wherein the panel is an interior trim panel.

10. The method of claim 8 wherein the panel is a door trim panel.

11. The method of claim 1 wherein the component is a door.

12. The method of claim 1 wherein the component is generally rigid.

* * * * *